(12) United States Patent
Ishikawa et al.

(10) Patent No.: US 6,571,069 B2
(45) Date of Patent: May 27, 2003

(54) PHOTOGRAPHIC ZENITH TELESCOPE

(75) Inventors: Tsuyoshi Ishikawa, Tokyo (JP);
Yutaka Ezaki, Tokyo (JP); Izumi Mikami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/948,575

(22) Filed: Sep. 10, 2001

(65) Prior Publication Data

US 2002/0150399 A1 Oct. 17, 2002

(30) Foreign Application Priority Data

Apr. 11, 2001 (JP) ........................................ 2001-112754

(51) Int. Cl.⁷ .............................................. G02B 21/36
(52) U.S. Cl. ...................... 396/432; 359/399; 359/556; 359/872; 348/552
(58) Field of Search ................... 359/363, 399, 359/400, 401, 555, 556, 665, 726, 730, 731, 857, 871, 872; 396/432; 348/61, 373, 552

(56) References Cited

U.S. PATENT DOCUMENTS

| | | | | | |
|---|---|---|---|---|---|
| 2,995,992 | A | * | 8/1961 | Merrit | 356/148 |
| 3,460,886 | A | * | 8/1969 | Rumsey | 359/859 |
| 3,761,158 | A | * | 9/1973 | Humphrey | 359/555 |
| 4,695,139 | A | * | 9/1987 | Bagby et al. | 359/366 |

OTHER PUBLICATIONS

Floating Mirror Horizon. Theory and Design, J. Suran, Astronomy & Astrophysics, Astron. Astrophys. Suppl. Ser. 131, 531–538 (1988).*

* cited by examiner

*Primary Examiner*—David M. Gray
(74) *Attorney, Agent, or Firm*—Oblon, Spivak, McClelland, Maier & Neustadt, P.C.

(57) ABSTRACT

The rays of light from an object under observation are condensed by objective lens. The incident light from the objective lens is reflected by plane reflector mirror to form a focused image on a detector. The plane reflector mirror floats in at least three reflector mirror floating vessels and even if the telescope tilts, a surface of the fluid in the vessel remains leveled and the plane reflector mirror does not vibrate. Further, the plane reflector mirror includes at least three pads, each of the pads floating in a corresponding reflector mirror floating vessel.

8 Claims, 6 Drawing Sheets

PRINCIPAL POINT

PHOTOGRAPHIC ZENITH TELESCOPE

BACKGROUND OF THE INVENTION

1. Technical Field

The present invention relates to a photographic zenith telescope which detects the light of interest coming from the zenith and which uses its movement to perform astronomical observation of the behavior of a particular celestial body.

2. Related Art

FIG. 6 shows the structure of a conventional photographic zenith telescope. The telescope condenses the rays of light from a celestial body of known position either at or near the zenith and a slight positional offset of the image on a detector is observed for the typical purpose of measuring a deflection in the revolution of the earth on its own axis. In FIG. 6, reference numeral 1 designates an objective lens for condensing the rays of light from an object of interest, 2 is mercury, 3 is a vessel of mercury 2, 4 is a detector, and 5 designates structural members for supporting the objective lens.

The rays of light from a celestial body to be observed are condensed by the objective lens 1, reflected by a reflecting surface created by the surface of the mercury 2, and imaged by the detector 4 positioned at the center of the objective lens 1. In this optical system, the objective lens 1 performs a single plane reflection to condense the incident light, so the distance between the objective lens 1 and the surface of the mercury 2 is about one half the focal length of the objective lens 1. The photographic zenith telescope having the structure shown in FIG. 6 will tilt for several reasons such as thermal deformation of the structural members 5. If this occurs, the objective lens 1, mercury vessel 3 and detector 4 also tilt en masse but the surface of the mercury 2 maintains the same plane, so the rays of light from the celestial body being observed form a focused image at the same point on the detector 4. If the revolving axis of the earth tilts due to small deflection, the direction of gravity that determines the surface of the mercury 2 also tilts and the rays of light from the celestial body of interest form an image in an offset position on the detector 4. This is the principle for measuring a deflection in the revolution of the earth on its own axis.

Problems To Be Solved

In the conventional photographic zenith telescope described above, the mercury 2 has to be positioned away from the objective lens by a distance about one half its focal length and this inevitably increases the size of the optical system in the direction of the optical axis. The mercury 2 in the vessel 3 is used as a plane reflector mirror but because of its high density, the optical system is undesirably heavy. As a further problem, the mercury vessel 3 has a temperature distribution in the mirror surface and if the mercury 2 expands, its vertical size changes to produce asperities in its mirror surface, producing a blurred or offset image on the detector 4.

SUMMARY OF THE INVENTION

The present invention is accomplished under these circumstances and its primary objective is to provide a photographic zenith telescope that has a smaller and lighter optical system and which is less prone to produce a blurred or offset image on the detector.

Means For Solving The Problems

The stated object of the invention can be attained by the photographic zenith telescope recited in aspect 1 which comprises an objective lens for condensing the rays of light under observation, a plane reflector mirror that is in a face-to-face relationship with the objective lens and placed in a position distant from the objective lens by about one half its focal length for reflecting the incident light from the objective lens, a detector positioned at the center of the objective lens through which the optical axis passes, the detector coinciding with the focal point of the reflected light from the plane reflector mirror, and a reflector mirror floating vessel containing a fluid on which the plane reflector mirror floats.

The photographic zenith telescope according to aspect 1 may be adapted as recited in aspect 2, wherein the reflector mirror floating vessel contains mercury on which the plane reflector mirror floats.

The photographic zenith telescope according to aspect 1 may also be adapted as recited in aspect 3, wherein the plane reflector mirror is equipped with intervening pads that cause the plane reflector mirror to float in the reflector mirror floating vessel.

The stated object of the invention can also be attained by the photographic zenith telescope recited in aspect 4 which comprises an objective lens for condensing the rays of light under observation, a plane main mirror that is in a face-to-face relationship with the objective lens and placed in a position distant from the objective lens by about a quarter of its focal length for reflecting the incident light from the objective lens, a plane auxiliary mirror that is in a face-to-face relationship with the plane main mirror and positioned between the objective lens and the plane main mirror for causing the reflected light from the plane main mirror to be reflected back to the plane main mirror, and a detector positioned at the center of the objective lens through which the optical axis passes, the detector coinciding with the focal point of the reflected light from the plane main mirror.

The photographic zenith telescope according to aspect 4 may be adapted as recited in aspect 5, wherein the plane reflector mirror and the plane auxiliary mirror float in a floating vessel.

The photographic zenith telescope according to aspect 1 or 4 may also be adapted as recited in aspect 6, wherein the detector is positioned at the principal point of the objective lens.

The photographic zenith telescope according to aspect 1 may also be adapted as recited in aspect 7, wherein the reflector mirror floating vessel has a plurality of fluid reservoirs, a sealing membrane for sealing the fluid contained in the fluid reservoirs, and a bypass tube interconnecting the spaces in the plurality of fluid reservoirs.

BRIEF DESCRIPTION OF THE DRAWINGS

FIG. 1 shows the structure of a photographic zenith telescope according to the first embodiment for carrying out the invention;

FIG. 2 shows the structure of a photographic zenith telescope according to the second embodiment for carrying out the invention;

FIG. 3 shows the structure of a photographic zenith telescope according to the third embodiment for carrying out the invention;

FIG. 4 shows the structure of another photographic zenith telescope according to the third embodiment for carrying out the invention;

FIG. 5 shows the structure of a photographic zenith telescope according to the fourth embodiment for carrying out the invention; and

FIG. 6 shows the structure of a conventional photographic zenith telescope.

DETAILED DESCRIPTION OF THE PREFERRED EMBODIMENTS

Mode for Carrying Out the Invention

EMBODIMENT 1

Figure 1:
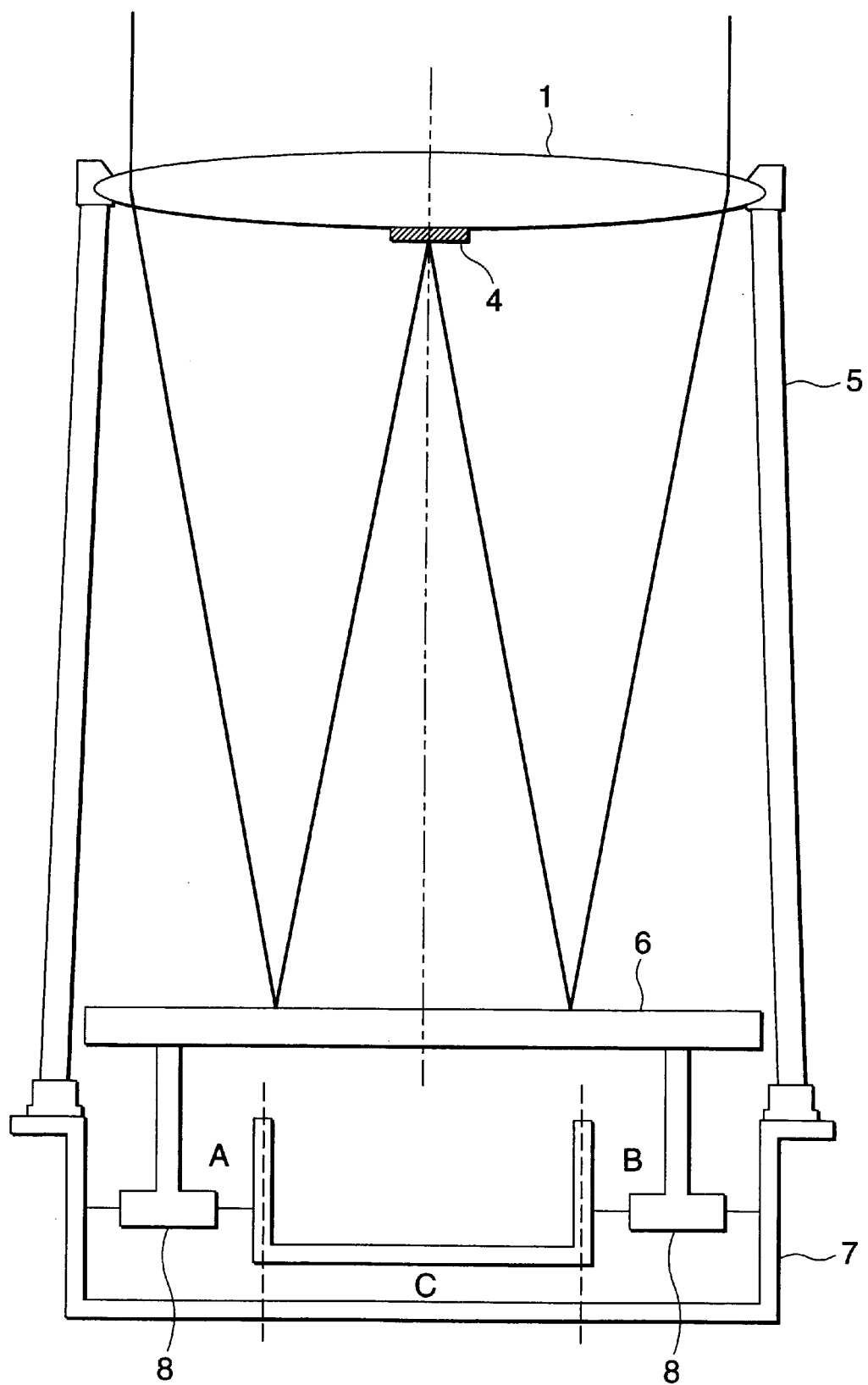
[FIG. 1]
Figure 6:
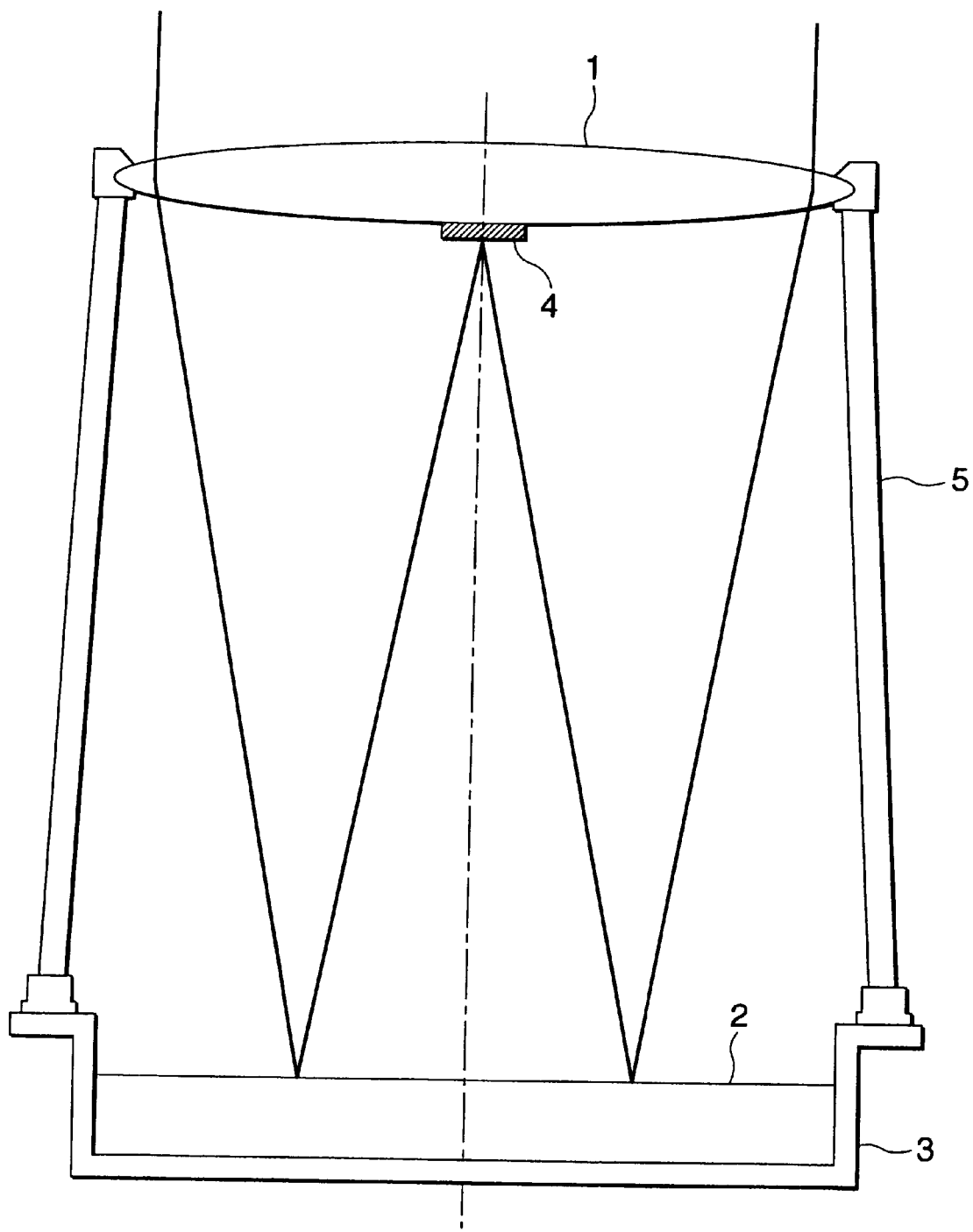
[FIG. 6]

The photographic zenith telescope according to the first embodiment for carrying out the invention is now described with reference to FIG. 1 which shows its construction. In FIG. 1, reference numeral 1 designates an objective lens for condensing the rays of light from an object to be observed, and 4 is a detector. The detector 4 uses a suitable imaging device such as a CCD (charge-coupled device), a two-dimensional array device or an artificial retinal chip. Indicated by 6 is a plane reflector mirror positioned in a face-to-face relationship with the objective lens 1 to reflect the incident light from it. The plane reflector mirror 6 is away from the objective lens 1 by a distance about one half its focal 7 length. The detector 4 is positioned at the center of the objective lens 1 through which the optical axis passes and the detector coincides with the focal point of the reflected light from the plane reflector mirror 6. Reference numeral 7 designates a reflector mirror floating vessel containing a fluid on which the plane reflector mirror 6 floats. Reference numeral 8 designates pads which float on the fluid in the reflector mirror floating vessel 7; the plane reflector mirror 6 is coupled to these pads so that it can float in the reflector mirror floating vessel 7. The reflector mirror floating vessel 7 shown in FIG. 1 consists of a fluid reservoir A, a fluid reservoir B and an intermediate vessel C for coupling fluid reservoirs A and B. For the sake of convenience in explanation, the three vessels are marked off by two dashed lines. In FIG. 1, the parts which are labelled with the same numerals as in FIG. 6 are identical or equivalent to the counterparts in FIG. 6.

We now describe the operation of the photographic zenith telescope in embodiment 1. The rays of light from the object under observation are condensed by the objective lens 1. The incident light from the objective lens 1 is reflected by the plane reflector mirror 6 to form a focused image on the detector 4. The plane reflector mirror 6 floats in the reflector mirror floating vessel 7 and even if the telescope tilts, the surface of the fluid in the vessel 7 remains level and so does the reflecting surface of the plane reflector mirror 6. If external vibrations occur, the fluid in the reflector mirror floating vessel 7 may occasionally vibrate due to resonance. The resonant frequency is no more than a few hertz and the present invention assumes that the plane reflector mirror 6 will not vibrate in a non-resonant situation. The plane reflector mirror 6 is equipped with pads 8 which float on the fluid in the reflector mirror floating vessel 7.

The fluid to be contained in the reflector mirror floating vessel 7 is typically mercury. Having high specific gravity, mercury can produce sufficient buoyancy to float the plane reflector mirror 6. Other materials can of course be used if they are liquid and have high enough specific gravity. In the conventional photographic zenith telescope, mercury is used as the plane reflector mirror and as the surface of plane reflection becomes larger, more mercury is used but this is unfavorable to the purpose of weight reduction. On the other hand, in the present invention, mercury is placed in fluid reservoirs A and B, so it occupies a relatively small volume of coupling vessel C; as a result, the photographic zenith telescope becomes smaller and lighter. As a further advantage, the precision of the reflecting mirror surface will not deteriorate even if a temperature distribution occurs in the mercury's surface. Consider the case where the temperature of the mercury in the fluid reservoir A rises; since the volume of the mercury in the fluid reservoir A increases, the fluid surface rises but at the same time the density of the mercury in the fluid reservoir A decreases, so the reaction that supports the pads 8 in the fluid reservoir A which is determined by the volume of the mercury times its density is constant and the pads 8 remain unchanged in position. Therefore, the reflecting surface of the plane reflector mirror 6 will not tilt even if the temperature in either of the two fluid reservoirs rises.

EMBODIMENT 2

Figure 2:
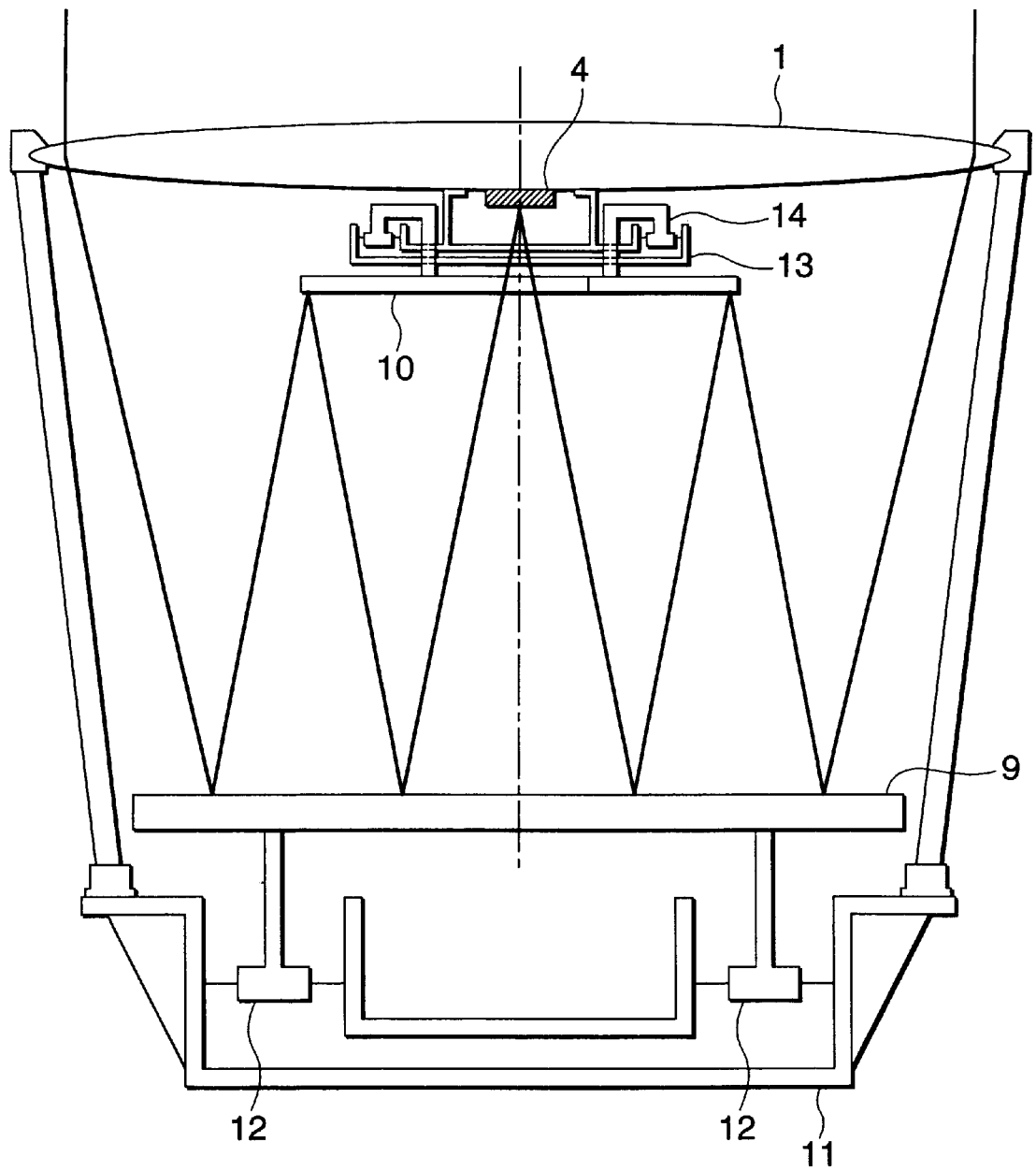
[FIG. 2]

The photographic zenith telescope according to the second embodiment for carrying out the invention is now described with reference to FIG. 2 which shows its construction. In FIG. 2, reference numeral 9 designates a plane main mirror that is positioned in a face-to-face relationship with the objective lens 1 to reflect the incident light from it. The plane main mirror 9 is away from the objective lens 1 by a distance about a quarter of its focal length. Indicated by 10 is a plane auxiliary mirror that is positioned between the objective lens 1 and the plane main mirror 9 in a face-to-face relationship with the latter so that the reflected light from the plane main mirror 9 is reflected back to it. The light reflected by the plane auxiliary mirror 10 is further reflected by the plane main mirror 9 to form a focused image on the detector 4 provided at the center of the objective lens 1 through which the optical axis passes. Reference numeral 11 designates a main mirror floating vessel containing a fluid on which the plane main mirror 9 is to float, and reference numeral 12 designates pads that float on the fluid in the main mirror floating vessel 11. The plane main mirror 9 is coupled to the pads 12 so that it floats in the main mirror floating vessel 11. Reference numeral 13 designates an auxiliary mirror floating vessel containing a fluid on which the plane auxiliary mirror 10 is to float, and reference numeral 14 designates pads that float on the fluid in the auxiliary mirror floating vessel 13. The plane auxiliary mirror 10 is coupled to the pads 14 so that it floats in the auxiliary mirror floating vessel 13. In FIG. 2, the parts which are labelled with the same numerals as in FIG. 1 are identical or equivalent to the counterparts in FIG. 1.

We now describe the operation of the photographic zenith telescope in embodiment 2. The rays of light from the object under observation are condensed by the objective lens 1. The incident light from the objective lens 1 is reflected by the plane main mirror 9. The reflected light is further reflected by the plane auxiliary mirror 10. The light reflected by the plane auxiliary mirror 10 is again reflected by the plane main mirror 9 to form a focused image on the detector 4. The plane main mirror 9 floats in the main mirror floating vessel 11. Even if the telescope tilts, the surface of the fluid in the vessel 11 remains level and therefore the plane main mirror 9 does not tilt. The plane main mirror 9 is equipped with pads 12 which float on the fluid in the main mirror floating vessel 11. The same design is adopted for the plane auxiliary mirror 10 to float in the auxiliary mirror floating vessel 13. Specifically, the plane auxiliary mirror 10 is equipped with pads 14 which float on the fluid in the auxiliary mirror floating vessel 13.

Thus, in embodiment 2, the plane main mirror 9 combines with the plane auxiliary mirror 10 to construct a reflection system and this contributes to shortening the distance between the objective lens 1 and the plane main mirror 9 by a sufficient degree to reduce the size of the photographic zenith telescope. As in embodiment 1, mercury is suitable as the fluid to be contained in the main mirror floating vessel 11 and the auxiliary mirror floating vessel 13. In each of the main and auxiliary mirror floating vessels, two fluid reservoirs are connected by an intermediate vessel and this design contributes to reducing the weight of the telescope by reducing the volume of mercury, and the reflecting surface will not tilt even if a temperature distribution occurs in the surface of the mercury. These are the same advantages as achieved in embodiment 1.

EMBODIMENT 3

Figure 3:
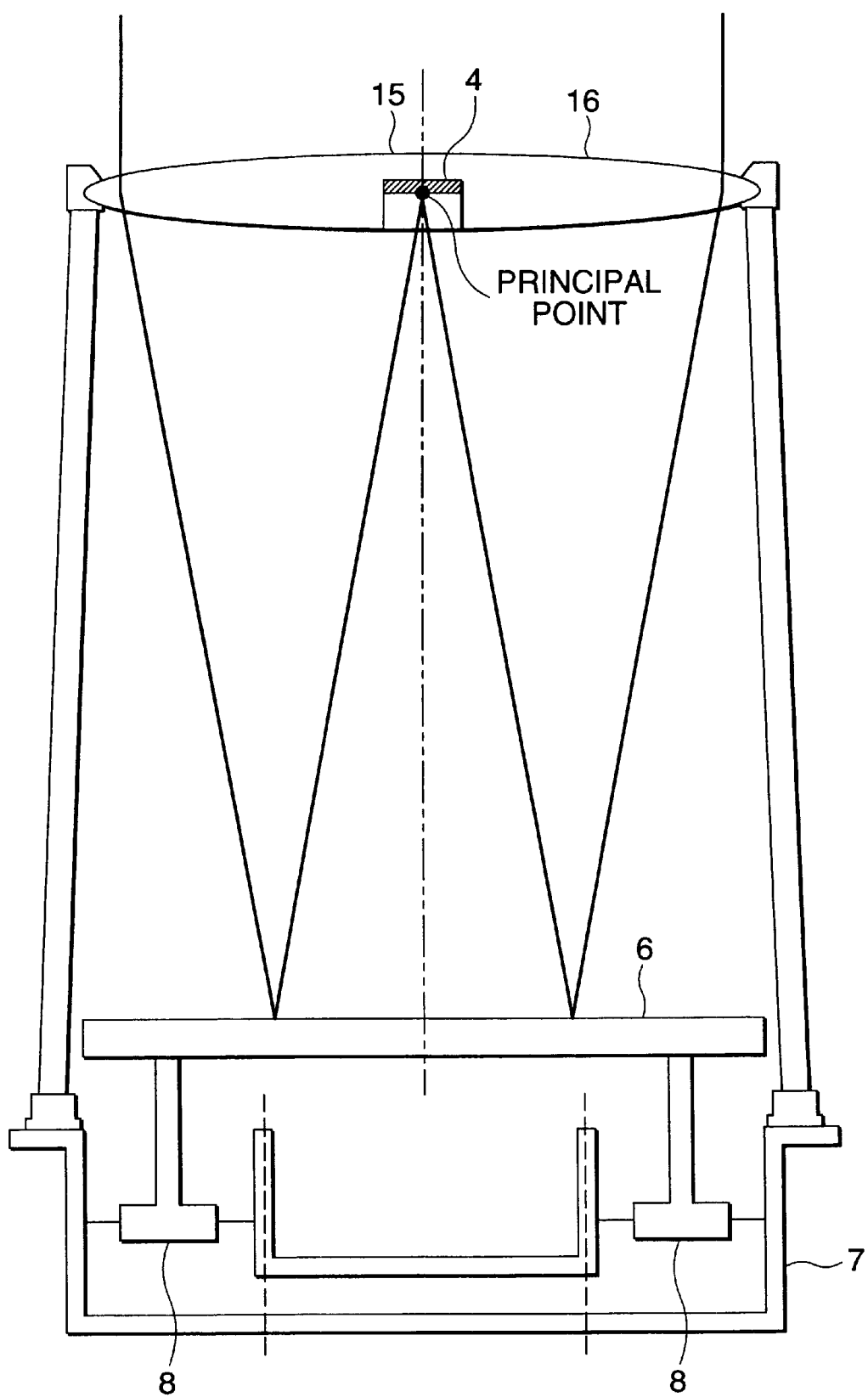
[FIG. 3]
Figure 4:
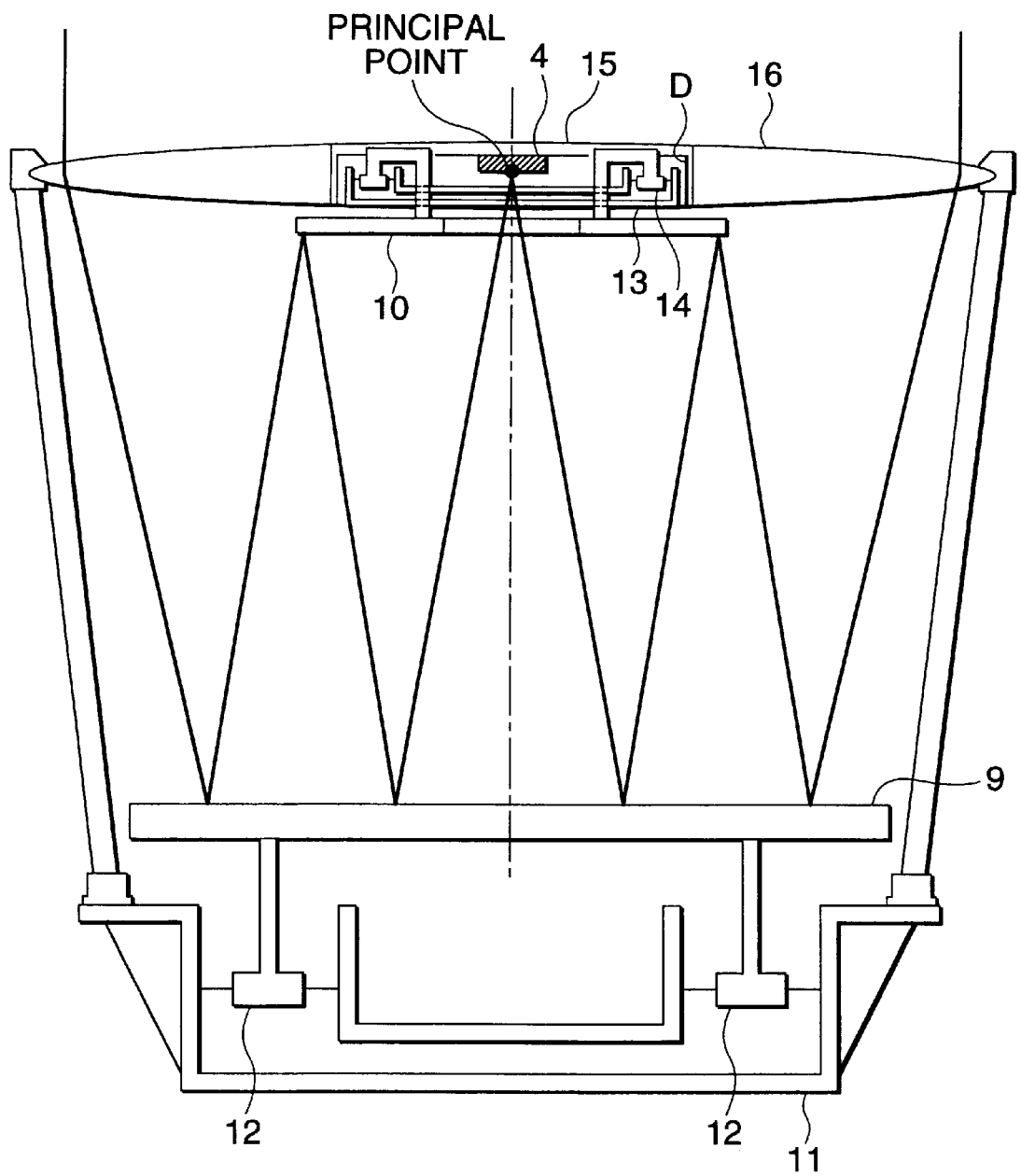
[FIG. 4]

In embodiments 1 and 2, the detector 4 is provided on the underside of the objective lens 1. Alternatively, the detector 4 may be positioned at the principal point of the objective lens as shown in FIGS. 3 and 4. FIG. 3 shows one structure of a photographic zenith telescope according to this embodiment 3, and FIG. 4 shows another structure of the photographic zenith telescope. In FIG. 3, reference numeral 15 designates a detector mount or a device for assisting in the mounting of the detector 4, and 16 is an objective lens having the detector mount 15 provided in the central area. In FIG. 3, the parts which are labelled with the same numerals as in FIG. 1 are identical or equivalent to the counterparts in FIG. 1.

FIG. 3 corresponds to the photographic zenith telescope according to embodiment 1 which is shown in FIG. 1. As shown in FIG. 3 since the detector 4 is positioned at the principal point of the objective lens 16, the movement of the point image obtained by condensing the rays of light from the object under observation can be measured more accurately than in embodiment 1. FIG. 4 corresponds to the photographic zenith telescope according to embodiment 2 which is shown in FIG. 2. Again the detector 4 is positioned at the principal point of the objective lens 16, so the movement of the point image obtained by condensing the rays of light from the object under observation, same as in FIG. 3, can be measured more accurately than in embodiment 2. In the structure shown in FIG. 4, the auxiliary mirror floating vessel 13 is snugly fitted within the detector mount 15 (its outer wall contacts the inner peripheral surface D of the mount 15), so the objective lens 16 and the plane auxiliary mirror 10 can be accommodated in a compact system. In FIG. 4, the parts which are labelled with the same numerals as in FIG. 2 are identical or equivalent to the counterparts in FIG. 2.

EMBODIMENT 4

Figure 5:
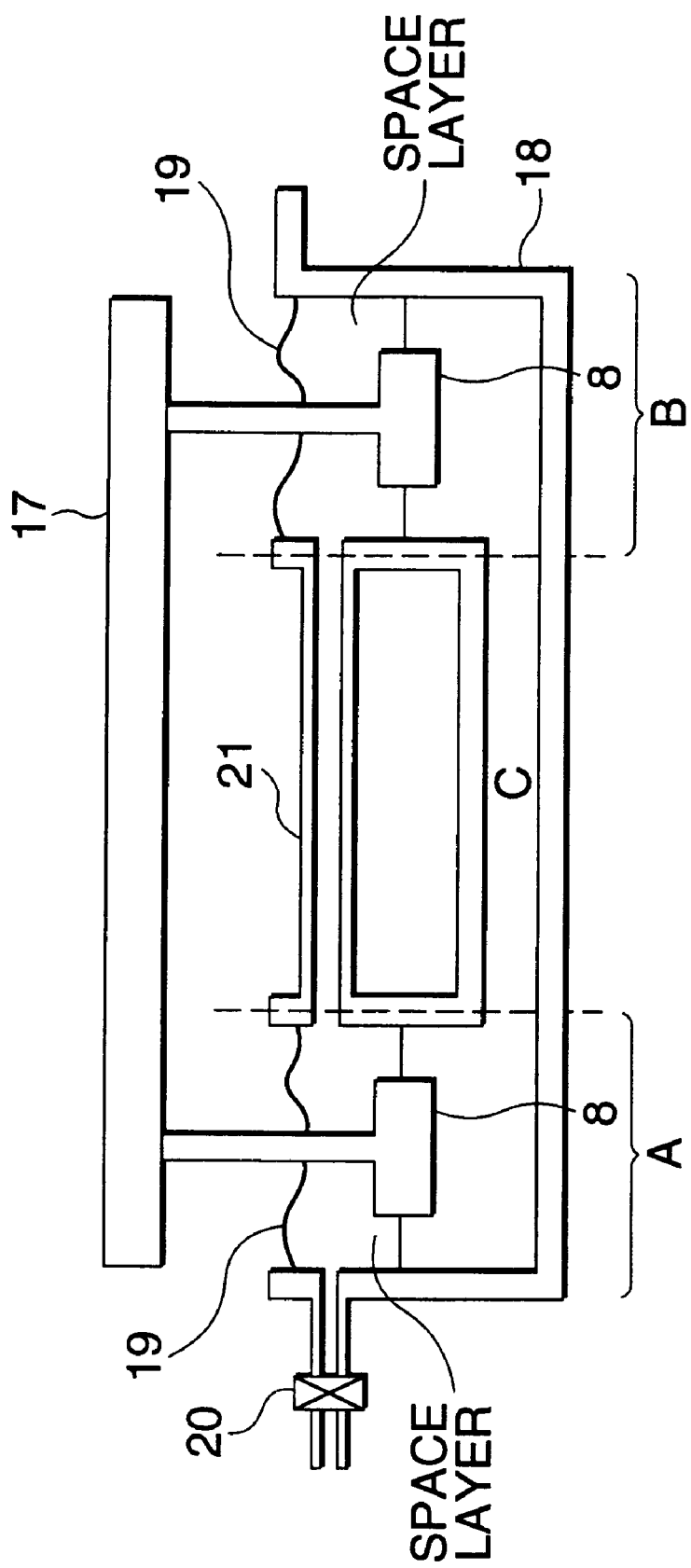
[FIG. 5]

Embodiment 4 differs from the foregoing three embodiments in that the reflector mirror floating vessel 7, main mirror floating vessel 11 and auxiliary mirror floating vessel 13 are adapted to prevent evaporation of the fluid contained in these vessels. FIG. 5 shows the structure of each of these floating vessels in a photographic zenith telescope according to embodiment 4. In FIG. 5, reference numeral 17 designates a mirror such as plane reflector mirror 6, plane main mirror 9 or plane auxiliary mirror 10; indicated by 18 is a floating vessel such as reflector mirror floating vessel 7, main mirror floating vessel 11 or auxiliary mirror floating vessel 13 which contain the fluid to float the mirror 17. As mentioned in connection with embodiment 1 with reference to FIG. 1, the floating vessel 18 consists of two fluid reservoirs A and B which are coupled together by means of an intermediate vessel C. Mirror 17 couples to pads 8 which float in fluid reservoirs A and B. Reference numeral 19 designates a sealing membrane that seals a fluid, say, mercury within the floating vessel 18; 20 is a pressure regulating valve for regulating the pressure in the floating vessel 18; and 21 is a bypass tube that connects the space layer above the fluid layers in two fluid reservoirs A and B of the floating vessel 18.

As is clear from FIG. 5, the bypass pipe 21 equalizes the pressures on the space layers in the fluid reservoirs A and B (the spaces above the fluid layers in the respective fluid reservoirs which are sealed by the sealing membrane 19) so that there will be no chance of the mirror 17 tilting due to the difference between the pressures in the fluid reservoirs A and B. In addition, the pressure regulating valve 20 regulates the difference between inside and outside of the space layer in each fluid reservoir. With this adjustment, the photographic zenith telescope of the invention can be used not only on terrestrial surfaces but also in space environment as on the lunar surface.

Advantages of the Invention

According to the invention recited in any one of aspects 1 to 3, the plane reflector mirror is floated in the reflector mirror floating vessel to avoid the use of the mercury surface as the reflecting surface. As a result, a bulky photographic zenith telescope can be constructed without undue increase in the weight of the mercury vessel. In addition to this advantage of weight reduction, the reflector mirror surface will not tilt even if there occurs a temperature distribution in the surface of mercury.

According to the invention recited in aspect 4 or 5, the plane main mirror and the plane auxiliary mirror are combined to constitute a reflecting optical system and this contributes to making a photographic zenith telescope of a smaller size in the direction of the optical axis.

According to the invention recited in aspect 6, the detector is positioned at the principal point of the objective lens and this ensures that the movement of the point image created by the rays of light from the object under observation can be measured more accurately.

According to the invention recited in aspect 7, the fluid in the mirror floating vessel is sealed and the spaces in the fluid reservoirs of the floating vessel are connected by the bypass tube. This not only prevents the evaporation of the fluid in each fluid reservoir but also equalizes the pressures created in the spaces of the respective fluid reservoirs to prevent the tilting of the mirror due to pressure difference.

What is claimed is:

1. A photographic zenith telescope comprising:
    an objective lens for condensing rays of light under observation,
    a plane reflector mirror that is in a face-to-face relationship with said objective lens and placed in a position distant from said objective lens by about one half focal length thereof for reflecting the incident light from said objective lens, the plane reflector mirror comprising at least three intervening pads,
    a detector positioned at a center of said objective lens through which the optical axis passes, said detector coinciding with a focal point of a reflected light from said plane reflector mirror, and
    at least three reflector mirror floating vessels containing a fluid on which said plane reflector mirror floats, wherein each intervening pad of said at least three intervening pads floats in a corresponding reflector mirror floating vessel of said at least three mirror floating vessels.

2. The photographic zenith telescope according to claim 1, wherein
said reflector mirror floating vessel contains mercury on which said plane reflector mirror floats.

3. The photographic zenith telescope according to claim 1, wherein
said plane reflector mirror further includes:
a plurality of intervening pads that cause said plane reflector mirror to float.

4. The photographic zenith telescope according to claim 1, wherein
said detector is positioned at the principal point of said objective lens.

5. A photographic zenith telescope comprising:
an objective lens for condensing rays of light under observation,
a plane main mirror that is in a face-to-face relationship with said objective lens and placed in a position distant from said objective lens by about a quarter of a focal length thereof for reflecting an incident light from said objective lens, the plane reflector mirror comprising at least three intervening pads,
a plane auxiliary mirror that is in a face-to-face relationship with said plane main mirror and positioned between said objective lens and said plane main mirror for causing the reflected light from said plane main mirror to be reflected back to said plane main mirror, and
a detector positioned at a center of said objective lens through which an optical axis passes, said detector coinciding with a focal point of a reflected light from said plane main mirror, wherein
each intervening pad of said at least three intervening pads floats in a corresponding reflector mirror floating vessel of at least three mirror floating vessels.

6. The photographic zenith telescope according to claim 5, wherein said plane auxiliary mirror floats in a floating vessel.

7. The photographic zenith telescope according to claim 5, wherein
said detector is positioned at the principal point of said objective lens.

8. The photographic zenith telescope according to claim 1, wherein
said reflector mirror floating vessel includes:
a plurality of fluid reservoirs,
a sealing membrane for sealing the fluid contained in said fluid reservoirs, and
a bypass tube interconnecting the spaces in said plurality of fluid reservoirs.

* * * * *